(No Model.)
W. M. MORSE.
VIBRATION ABSORBING DEVICE FOR BICYCLES.
No. 596,080. Patented Dec. 28, 1897.
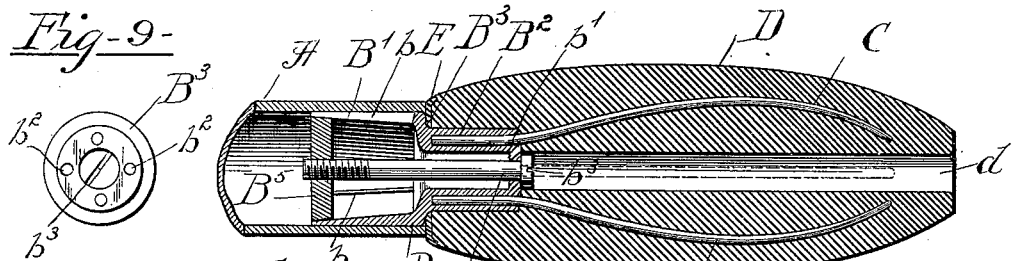
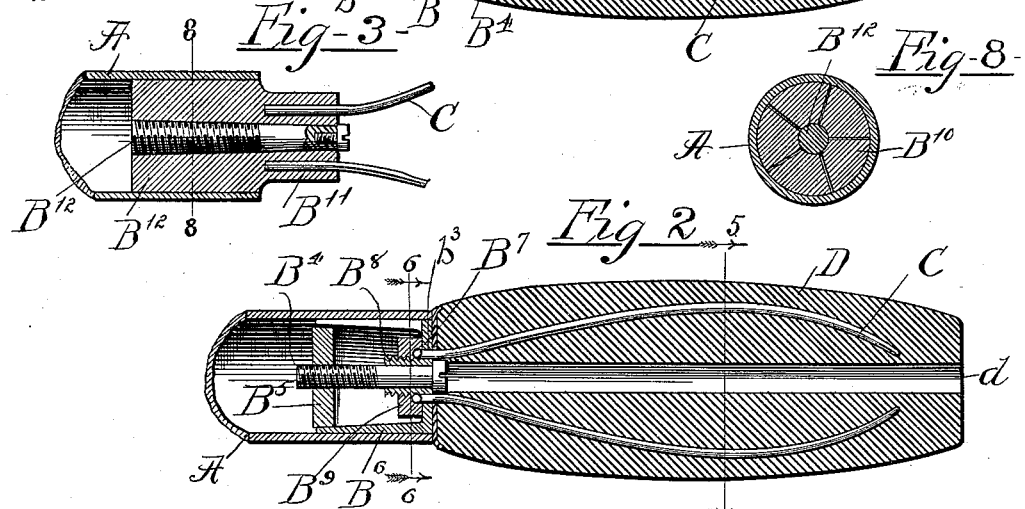
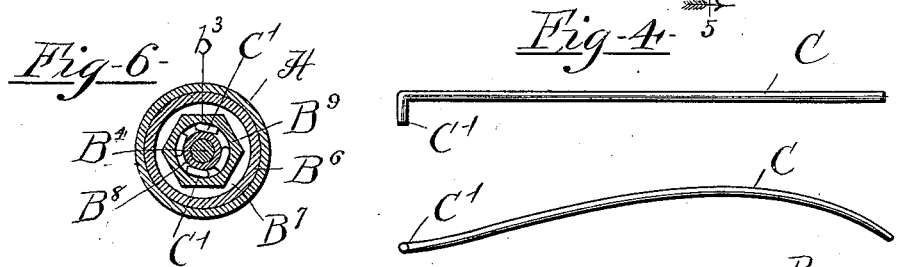
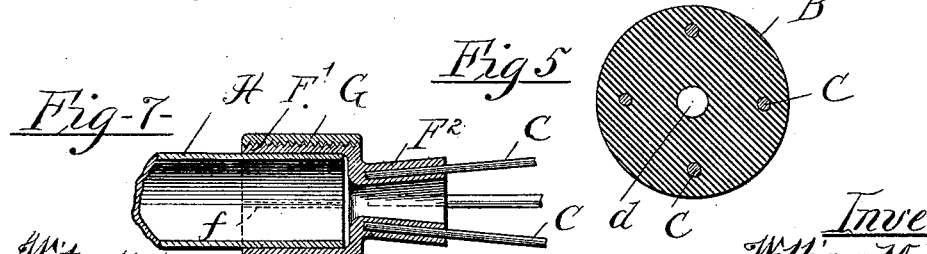
Witnesses
L. Clinton Hamlin
Harold G. Barrett
Inventor
William M. Morse
by Potter & Brown
his Attorneys

UNITED STATES PATENT OFFICE.

WILLIAM M. MORSE, OF CHICAGO, ILLINOIS.

VIBRATION-ABSORBING DEVICE FOR BICYCLES.

SPECIFICATION forming part of Letters Patent No. 596,080, dated December 28, 1897.

Application filed September 10, 1896. Serial No. 605,376. (No model.)

*To all whom it may concern:*

Be it known that I, WILLIAM M. MORSE, of Chicago, in the county of Cook and State of Illinois, have invented certain new and useful Improvements in Vibration-Absorbing Devices for Bicycles and other Machines; and I do hereby declare that the following is a full, clear, and exact description thereof, reference being had to the accompanying drawings, and to the letters of reference marked thereon, which form a part of this specification.

This invention relates to improvements in devices for absorbing the vibration of vehicles, machines, and the like, whereby the vibration of the rigid part of said vehicle or machine is absorbed before reaching the user, said invention being of the same general character as that shown in my previous patent, No. 578,021, granted to me on the 2d day of March, 1897.

The application of my invention is varied, but I have shown it herein as applied to the grip of a bicycle handle-bar.

The object of my invention is to provide an improvement in devices of the character referred to, wherein a yielding member may be firmly secured to the vibrating part of a machine, while at the same time preserving the full resiliency thereof.

My invention also relates to a novel construction of the springs in devices of the character referred to, said springs herein shown consisting of straight or substantially straight parallel extending springs as distinguished from a spiral spring, as shown in said prior patent. Said invention also refers to the manner of securing such springs in place, whereby they may be detachably or otherwise held firmly in their proper position.

The invention consists in the matters hereinafter referred to, and more particularly pointed out in the appended claims, and will be readily understood by reference to the accompanying drawings and subjoined description.

In said drawings, Figure 1 represents a longitudinal sectional view of a grip for bicycle handle-bars embodying my invention, showing the means for attaching it to the handle-bar. Fig. 2 is a similar view showing a modification in the springs and the means of securing them in place. Fig. 3 is a longitudinal sectional view of a modified form of attaching the grip to the handle-bar. Fig. 4 shows two views of the springs used in the form of grip shown in Fig. 2, taken in planes at right angles to each other. Fig. 5 is a transverse section taken on line 5 5 of Fig. 2. Fig. 6 is a transverse section taken on line 6 6 of Fig. 2, looking in the direction indicated by the arrows. Fig. 7 is still another modification of the means for attaching the device to a handle-bar. Fig. 8 is a transverse section taken on line 8 8 of Fig. 3. Fig. 9 is a front elevation of the attaching device with the springs removed.

First describing the construction shown in Figs. 1 and 9, A designates the handle-bar, and B designates as a whole a securing device for securing the grip to the handle-bar, comprising an expansible sleeve $B'$ and an integral reduced hollow portion $B^2$, extending outwardly in axial alinement therewith. Said expansible sleeve $B'$ has an outer diameter substantially equal to the inner diameter of the bar A and is provided in its side walls with a plurality of longitudinal slits $b$, whereby it may be expanded outwardly, as hereinafter to be described. An annular shoulder $B^3$ is formed at the junction of the reduced portion $B^2$ with the sleeve $B'$, which stands flush with the end of the bar A when in position therein. The end of the hollow reduced portion is closed but for a small aperture $b'$, provided for the passage of the securing-bolt $B^4$. The walls of said reduced portion $B'$ are thicker than the walls of the sleeve B, but are solid throughout their circumferential area. Said walls are provided with a plurality of longitudinally-extending apertures $b^2$, extending throughout the length thereof, for the insertion of springs, hereinafter to be described. The interior surface of the sleeve portion or that portion of the securing device thus far described, which rests within the end of the handle-bar A, is made to flare outwardly by reducing the thickness of the walls toward the outer edge thereof, so that the inner diameter of the sleeve at this point is greater than the diameter thereof at the shoulder $B^3$. $B^4$ designates a flat-headed bolt of a length slightly greater than the length of said securing device B. The outer end of said bolt is threaded and provided with a tapered nut $B^5$, the angle of the taper of said nut corresponding to the interior angle of the sleeve $B'$. The head of the bolt $B^4$ is provided with a groove for the reception of a screw-driver or like tool by which the bolt may be turned. In assembling the parts thus described the bolt $B^4$ will be passed axially through the securing device B, with the flat head thereof abutting against the end of the reduced portion $B^2$. In this position the end of the bolt will extend slightly beyond the outer end of the sleeve $B'$, as before stated, whereby the nut $B^5$ may be turned slightly onto the bolt and retained while the sleeve is inserted into the end of the tubular bar A. The bolt is now turned by means of a suitable tool engaging the slot $b^3$ of the bolt-head, and the wedge-shaped or tapered nut $B^5$ will be drawn inwardly, thus causing the several parts or segments of the sleeve $B'$ to be spread with their outer surfaces in rigid frictional contact with the inner surface of the bar A and also binding the flat head of the bolt $B^4$ firmly against the flat outer end of the reduced portion $B^2$.

C C designate a plurality of wire springs of sufficient length to form a hand-grip inserted into the longitudinal apertures $b^2$ of the walls of the reduced portion $B^2$ and secured therein by friction, soldering, or otherwise. Said springs are curved slightly outwardly between their ends, so as to form when properly assembled the general outline or contour of a hand-grip, but are rectilinear in the plane at right angles to said curve, as shown in Fig. 4, so that the outer end of each spring stands in approximately the same plane as the inner end thereof.

After the springs have been secured in place as described they are covered with any suitable covering D, preferably of plastic rubber, formed in a mold, so as to give the desired shape to the handle or grip. This covering will preferably be arranged to envelop the springs C on all sides to a suitable thickness, so as to form a continuous flexible covering for the same. The hand-grip thus formed is next subjected to a vulcanizing process, whereby the rubber may be hardened to retain its form in use, but sufficiently elastic to coact with the springs to absorb the vibration of the handle. The rubber covering will not be made solid, but will be provided with a central cavity $d$, through which access may be had to the slot $b^3$ in the head of the bolt $B^4$.

E designates a ferrule mounted on the reduced portion $B^2$ of the securing device between the shoulder $B^3$ thereof and the end of the rubber covering D to give finish at this point.

In Figs. 2, 4, and 6 I have shown a modified form of means for attaching the springs. In said figures the reduced or neck portion shown in Figs. 1 and 9 is omitted and the outer end of the sleeve $B^6$ when in position in the bar A rests flush with the end of said bar. Said sleeve $B^6$ is closed by a wall $B^7$. The inner face of said wall is provided with an inwardly-projecting circular stud $B^8$, which is centrally apertured for the passage of the bolt $B^5$, the aperture extending through the wall $B^7$. Said stud is externally screw-threaded and provided with a nut $B^9$ for the purpose hereinafter stated. Said wall $B^7$ is also provided with a plurality of smaller apertures $b^3$, circularly disposed around the bolt-aperture and equal in number to the number of the springs C. In the construction shown in said Figs. 2, 4, and 6 said springs C are provided with a bent portion $C'$, turned at right angles to the plane of the rectilinear side of the spring C. The springs thus constructed are inserted into the apertures $b^3$ and turned so that the right-angled portion thereof will lie tangent to the circumference of the circular stud $B^8$ and with the outer ends of said right-angled portion standing in uniform relation to the circumference of said stud $B^8$, in which position the concave surfaces of the curved springs C will face inwardly and the convex surfaces thereof will stand in position to form the outline of a hand-grip. The nut $B^9$ is now turned down upon the circular stud $B^8$ to clamp the springs firmly in position, as described. Said nut $B^9$ is provided with an annular recess around its aperture and concentric therewith on its face adjacent to the wall $B^7$ of the sleeve, within which the right-angled portions $C'$ of the spring C are adapted to lie when the nut is clamped upon them. The manner of enveloping the springs with the rubber and attaching the same to the end of the bar by means of the bolt $B^4$ and tapered nut $B^5$ will obviously be the same as described in connection with Figs. 1 and 9.

In Figs. 3 and 8 is shown still another modification of the means for securing the grip to the bar A. In said figure the walls of the sleeve $B^{10}$ and reduced portion $B^{11}$ are made of considerable thickness, so as to leave a comparatively small axial opening therethrough of gradually increasing diameter from the inner to the outer end thereof, and, as in the previously-described figures, the walls of the sleeve portion are provided with a plurality of longitudinal slits, as shown in cross-section in Fig. 8, whereby said wall may be outwardly expanded into frictional engagement with the inner surface of the bar A. Means for expanding the walls are provided by means of a screw-threaded tapered bolt $B^{12}$, fitted into the correspondingly-threaded flaring aperture of the sleeve. It is evident that by turning the bolt slightly outward the segments of the sleeve will be forced firmly against the inner surface of the bar and the sleeve thereby securely held from lateral movement. Means by which said tapered bolt may be engaged by a suitable tool are shown in this instance to consist of a flat head iron screw, threaded into the end of the tapered bolt, the threads of said screw being on an opposite angle from those of the bolt. Obviously, however, the bolt may itself be slotted on its outer end for the engagement of a tool by which it may be turned.

In Fig. 7 I have shown still another modification in which the sleeve to which the springs are attached is fitted over the end of the handle-bar instead of within it, as in the previously-described constructions. In said figure F designates the securing device, comprising a collapsible sleeve F' and an integral reduced portion F². Said collapsible sleeve is of an interior diameter approximately equal to the outer diameter of the bar A and is exteriorly screw-threaded, and the outer surface of the wall thereof is given an inward inclination by slightly reducing the thickness of said wall toward its inner end. The sleeve is provided with a plurality of longitudinal slits $f$, as in the construction heretofore described. The reduced or neck portion F² is similar to that shown in Fig. 1, but the walls are slightly inclined from the axis thereof, giving to the same a flaring or bell-shaped appearance. G designates a clamping sleeve or collar interiorly screw-threaded to correspond with the threads on the outer surface of the sleeve F, the inner surface of the walls of which is slightly inclined in a direction opposite to the inclination of the adjacent surface of the sleeve F. It is obvious by the construction shown that when the clamping-sleeve G is turned upon the collapsible sleeve F the wedge-like action caused by the oppositely-arranged inclinations of the adjacent walls of the sleeves will cause the segments of the sleeve F to be pressed into firm frictional engagement with the bar and thus held from relative movement therewith. By reason of the flaring form of the reduced portion F² the spring C need not be curved or bent adjacent to the walls thereof, but will project outwardly in the same plane to the point of curvature.

While I have herein shown what I deem to be preferred embodiments of my invention, yet it will be obvious that modifications may be made in the details thereof without departing from the spirit of the invention and without involving more than ordinary mechanical skill. I do not, therefore, wish to be limited to the precise details shown except as made the subject of specific claims.

I claim as my invention—

1. A device for absorbing vibration comprising a supporting-stud adapted to be secured to the vibratory part and a plurality of uncoiled springs extending outwardly from said stud in a general direction parallel with the axis of the stud, the outer ends of said springs being disconnected whereby they may have movement with relation to each other and a covering for said springs.

2. A device for absorbing vibration comprising a supporting-stud adapted to be secured to the vibratory part, a plurality of uncoiled springs projecting from said stud, said springs being curved between their ends and arranged about the axis of said stud to form a hand-grip and a continuous mass of yielding material enveloping said springs.

3. A device for absorbing vibration comprising a hollow supporting-stud provided with a plurality of apertures, a plurality of outwardly-extending springs adapted to be secured in said apertures having bent end portions adapted to lie upon the inner side of said stud at right angles to the body portion, means for rigidly securing said springs in position comprising a threaded boss on the stud and a nut on the boss adapted to engage the extreme inner ends of said springs and means for securing said stud to a vibratory part.

In testimony that I claim the foregoing as my invention I affix my signature, in presence of two witnesses, this 7th day of September, A. D. 1896.

WILLIAM M. MORSE.

Witnesses:
TAYLOR E. BROWN,
WILLIAM L. HALL.